Dec. 29, 1925.                                                                1,567,579
G. M. EAMES
GUARD FOR MOTOR VEHICLES
Filed March 3, 1924         2 Sheets-Sheet 1
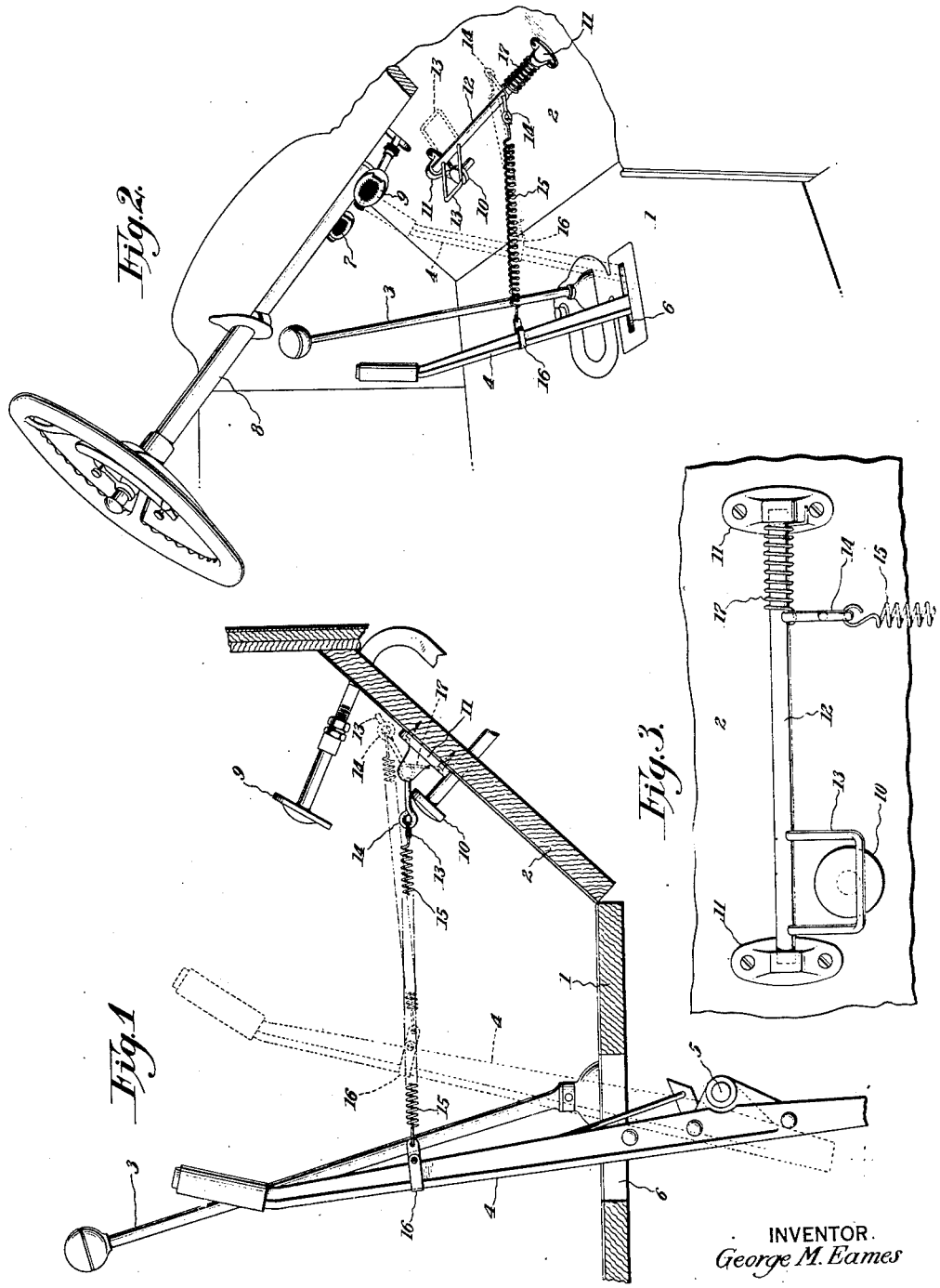
INVENTOR.
George M. Eames
WITNESSES
BY
ATTORNEY

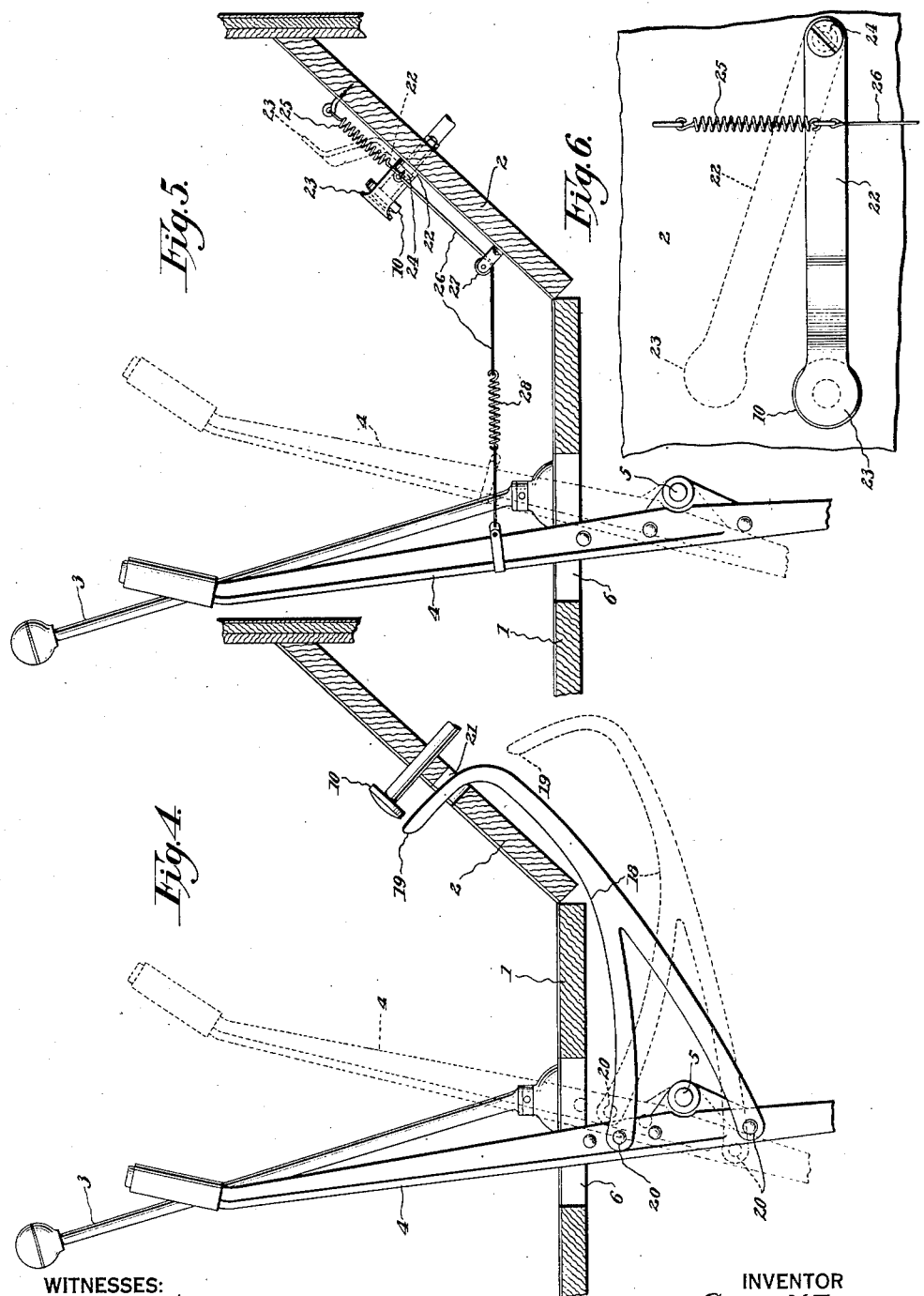

Patented Dec. 29, 1925.

1,567,579

UNITED STATES PATENT OFFICE.

GEORGE M. EAMES, OF BRIDGEPORT, CONNECTICUT.

GUARD FOR MOTOR VEHICLES.

Application filed March 3, 1924. Serial No. 696,568.

*To all whom it may concern:*

Be it known that I, GEORGE M. EAMES, a citizen of the United States, residing at Bridgeport, in the county of Fairfield and State of Connecticut, have invented certain new and useful Improvements in Guards for Motor Vehicles, of which the following is a specification.

This invention relates to improvements in controlling devices for motor-vehicles and has for an object to provide improved means for warning an operative against unintentionally driving a motor-vehicle with a brake-lever occupying a brake-applying position.

Another object of this invention is to provide means interfering with a normal manipulation of a vehicle-controlling element when a brake-lever occupies a brake-applying position.

More specifically, the present invention has for an object to provide means interfering with a normal manipulation of a fuel-supply controlling element when the usual emergency-brake lever occupies a brake-applying position.

Other objects of this invention will be apparent from the following description and claims.

It is a common occurrence even among experienced motorists to start a motor-vehicle and travel a considerable distance before observing the brake-applying position of the emergency-brake lever. In frequent instances this condition is unobserved until the heated brake-bands give evidence thereof. Obviously when driving a motor-vehicle with the emergency-brake applied, the operating parts of the vehicle are subjected to abnormal and injurious strains, while the brake-material may be injured to an extent rendering the brake unreliable in its action on emergency occasions when it is absolutely essential to the safety of the occupants of the vehicle that the brake be dependable.

In a preferred embodiment of the present invention, there is provided a guard which is so disposed with respect to the foot-controlled fuel-supply throttle or accelerator as to prevent a normal manipulation of the accelerator in a brake-applying position of the emergency-brake lever. To this end, the guard is operatively connected with the brake-lever in a manner such that the guard assumes interfering and non-interfering positions in accordance with the braking and brake-release positions of the brake-lever.

In the accompanying drawings, Fig. 1 is a sectional view in side elevation of a portion of a motor-vehicle, illustrating an application thereto of the present improvement, and Fig. 2 is a perspective view of the same. Fig. 3 is a top-plan view of the accelerator and guard therefor illustrated in Figs. 1 and 2. Figs. 4 and 5 are sectional views in side elevation, illustrating modified forms of the improvement. Fig. 6 is a top-plan view of the modification illustrated in Fig. 5.

Referring to the drawings, the present improvement in the embodiment illustrated in Figs. 1 to 3 inclusive is shown as applied to a motor-vehicle having a horizontal floor-board 1 and an inclined foot-board 2. Projecting through the floor-board 1 is a gear-shift lever 3 and an emergency-brake lever 4, of which the latter is fulcrumed upon a pivot-pin 5 and is shiftable in the usual manner in a slot 6 provided in the floor-board. Projecting through the inclined foot-board 2 is a clutch-lever 7, a steering-wheel post 8, a foot-brake lever 9 and a foot-actuated fuel-supply controlling throttle 10 usually termed the accelerator. The elements recited are those commonly employed in motor-vehicles and may be of any approved or preferred construction, their mode of operation being so well understood that it is deemed unessential to an understanding of the present invention to describe them in detail.

As previously stated herein, the present invention specifically aims to provide simple means guarding against a continuous driving of a vehicle when the emergency-brake lever 4 occupies a brake-applying position. To this end a preferred embodiment of the present improvement is illustrated in Figs. 1 to 3, inclusive, but it is apparent that various modifications thereof may be constructed all within the spirit and scope of the invention, which broadly contemplates the interposition of a guard or baffle between a brake-lever and a manually-operable vehicle-controlling member interfering with a normal manipulation of said member, whereby an operator's attention is directed to the position of the brake-lever by positive means.

In the embodiment of the invention illustrated in Figs. 1 to 3 inclusive, a pair of spaced bearing brackets 11 are suitably secured upon the inclined foot-board 2, in which brackets is journaled an oscillatory guard-rod 12. The guard-rod 12 carries a guard 13 in the present instance in the form of a rod or wire looped into substantial U-shape. The rod 12 is so disposed with respect to the foot-throttle 10 that, in its forward position, the guard 13 overlies the throttle 10 in a manner such that it interferes with a normal manipulation of the throttle, while in its retracted position the guard is entirely out of the way. The guard 13 is so connected with the emergency-brake lever 4 that its effective and ineffective positions are determined by the brake-applying and release positions of said lever regardless of the degree of application of the brake. To this end, there is provided on the rod 12 a hook 14 projecting laterally from said rod substantially in the projection plane of the guard 13. This hook is connected by means of a coil-spring 15 with a clamp 16 suitably secured upon the emergency-brake lever 4. A spring 17 coiled about the rod 12 bears upon the hook 14 and one of the brackets 11 to urge the guard into retracted position indicated by dotted lines in Figs. 1 and 2. It will be apparent from the foregoing that when the brake-lever 4 is shifted from its dotted line position to the full line position, as in Fig. 1, for instance, the rod 12 is oscillated to cause the guard 13 to occupy a position substantially in alinement with its spring-connection with the brake-lever wherein the guard overlies the foot-throttle 10, and it will occupy this position regardless of the degree of application of the brake. When the brake-lever 4 is released, the spring 17 returns the guard into ineffective position.

In the modification illustrated in Fig. 4, the shank 18 of a guard 19 is directly secured upon the brake-lever 4 below the floor-board 1, as by means of the rivets 20. The guard 19 extends forwardly below the foot-board 2 and being bent upwardly from the shank 18 thereof it is adapted to be projected through a slot 21 in the foot-board 2 immediately in advance of the foot-throttle 10 by the shifting of the emergency-brake lever 4 into brake-applying position. Therefore in the brake-applying position of the lever 4, the guard 19 is so disposed as to interfere with a normal manipulation of the foot-throttle 10. This evidently constitutes an extremely simple embodiment of the invention, its mode of operation and its effectiveness being readily apparent.

In the modification illustrated in Figs. 5 and 6, the shank 22 of a guard 23 is pivotally secured upon the foot-board 2 by means of a pivot-bolt 24, whereby the guard is free to swing in a plane substantially parallel to the plane of the inclined foot-board 2. The shank 22 is bent upwardly between its ends so that in its effective position the guard 23 overlies the foot-throttle 10. A spring 25 is suitably connected with the guard-shank 22 to normally urge the guard 23 into its retracted, ineffective position indicated by dotted lines in both Figs. 5 and 6. In order to render the guard 23 effective in a brake-applying position of the lever 4, it is connected with said lever by means of a flexible element 26 passing under a directional pulley 27. To provide for different brake-applying positions of the lever 4, a light spring 28 is preferably interposed in said flexible element 26. The operation of this modification will also be self-evident.

It is of course well understood that in its normal manipulation the throttle-member 10 is depresseed by an operator's foot to increase the fuel supply. In each of the several modifications shown the inventive idea is to interfere with this normal manipulation of the throttle-member 10 and is accomplished by shifting a baffle or guard into the path of movement of an operator's foot whenever the emergency-brake is applied.

Having thus set forth the nature of the invention, what I claim herein is—

1. In a motor-vehicle, the combination with an emergency-brake lever, a foot-board and a foot-actuated throttle-member projecting above said foot-board, of a guard shiftable from an inoperative position into a position overlying said throttle-member whereby said guard is interposed between an operator's foot and the throttle-member to prevent a normal actuation of said throttle-member, and an operative connection between said guard and emergency-brake lever for shifting the guard from an inoperative to its operative position.

2. In a motor-vehicle, the combination with an emergency-brake lever, a foot-board and a foot-actuated throttle-member projecting above said foot-board, of a guard shiftable through the foot-board into a position interfering with a normal manipulation of said member, and an operative connection between said guard and brake-lever for shifting said guard upon movement of the brake-lever into brake-applying position.

In testimony whereof I affix my signature.

GEORGE M. EAMES.